(12) United States Patent
Hare (10) Patent No.: US 11,713,003 B2
(45) Date of Patent: Aug. 1, 2023

(54) VEHICULAR ACCESSORY ADAPTER (71) Applicant: William Frederick Hare, North Fort Myers, FL (US)

(72) Inventor: William Frederick Hare, North Fort Myers, FL (US)

( * ) Notice: Subject to any disclaimer, the term of this patent is extended or adjusted under 35 U.S.C. 154(b) by 0 days.

(21) Appl. No.: 17/899,764

(22) Filed: Aug. 31, 2022

(65) Prior Publication Data

US 2022/0410812 A1 Dec. 29, 2022

Related U.S. Application Data (60) Provisional application No. 63/308,582, filed on Feb. 10, 2022.

(51) Int. Cl.
*B60R 11/00* (2006.01)
*B60Q 1/00* (2006.01)

(52) U.S. Cl.
CPC ............ *B60R 11/00* (2013.01); *B60Q 1/0029* (2013.01); *B60R 2011/004* (2013.01)

(58) Field of Classification Search
CPC .. B60R 11/00; B60R 2011/004; B60Q 1/0029
USPC ........................................ 296/1.07
See application file for complete search history.

(56) References Cited

U.S. PATENT DOCUMENTS

| 9,505,352 | B2 * | 11/2016 | Fife ........................... B60R 7/14 |
| 11,192,504 | B2 * | 12/2021 | Bennett ................... B60R 3/005 |
| 11,345,414 | B1 * | 5/2022 | Eaton ....................... B60J 1/006 |
| 11,498,492 | B2 * | 11/2022 | Schmalriede ........... B60R 11/00 |

OTHER PUBLICATIONS

Aeisoy, "Aeisoy Limb Risers for Bronco Accessories 2021+ Eliminate Ropes Through Jungle Protector Obstacles," Aug. 4, 2022, https://www.amazon.com/AEISOY-Accessories-Eliminate-Protector-Obstacles/dp/B0B8NCCJSJ.
Hgcar, "Hgcar Stainless Steel Limb Risers Kit Through The Jungle Automobile Protector Obstacle Eliminate Rope 8PCS Kit for Bronco 2021 2022," Aug. 9, 2022, https://www.amazon.com/Hgcar-Stainless-Automobile-Protector-Eliminate/dp/B0B9339V99.
Unknown Author, "JK Limb Riser Adjustable Limb Risers Kit Though the Jungle . . . ," Aug. 12, 2021, https://www.amazon.com/Adjustable-Protector-Eliminate-Protective-Compatible/dp/B09CG3VFK2/.
Unknown Author, "Ajustable Branch Line Limb Riser Obstacle Eliminiate Rope for 4Runner 10+," Jul. 4, 2021, https://www.ebay.com/itm/313195408294.
Unknown Author, "Car Adjustable Branch Limb Riser Kit Protect Lock For 4runner 2010+ Black," Nov. 24, 2021, https://www.ebay.com/itm/403315340093.

\* cited by examiner

*Primary Examiner* — Pinel E Romain
(74) *Attorney, Agent, or Firm* — George F. Wallace (57) ABSTRACT

A vehicular accessory adapter attaches a vehicular accessory to a front vehicular mount of a vehicle, and includes a front connector having a main body, a first and second front connector openings, and a front connector flange having a front connector attachment structure to which an accessory can attach; and first and second attachment elements to secure the front connector to the front vehicular mount. The adapter can optionally include a spacer configured to position between the front vehicular mount and the front connector. The adapter can further optionally include a rear connector having a base a base opening and a rear connector flange to which an accessory can attach.

15 Claims, 5 Drawing Sheets

VEHICULAR ACCESSORY ADAPTER

RELATED DOCUMENTS

This application relates to, incorporates by reference in its entirety, and claims the priority benefits of co-pending U.S. Provisional Patent Application Ser. No. 63/308,582, entitled "LIMB RISER ASSMEBLY" and filed on Feb. 10, 2022 by William Frederick Hare.

FIELD OF THE INVENTION

The present invention relates to vehicular accessories and vehicular accessory mounting adapters.

SUMMARY OF THE INVENTION

The present invention provides a vehicular accessory adapter that can attach a vehicular accessory to a front vehicular mount positioned at a front exterior portion of a vehicle having a front and a rear.

In an exemplary embodiment of the present invention, such an adapter can include a front connector having a main body, first and second front connector openings, and a front connector flange that can extend from the main body and can have a front connector attachment structure thereon; and first and second attachment elements for attaching such as adapter to such a front vehicular mount.

In an exemplary aspect of the present invention, such first and second attachment elements can be respectively configured to extend through the first and second front connector openings and to attachably interface with the front vehicular mount so as to attach such a front connector to the front vehicular mount.

In another exemplary aspect, such a front connector attachment structure can be configured to attach the vehicular accessory to the front connector flange.

In yet another exemplary aspect, such a front connector flange can extend towards the rear of a vehicle.

In another exemplary embodiment of the invention, such an adapter can further include a spacer having first and second spacer openings.

In still another exemplary aspect, such a spacer can be configured to be positioned between the front vehicular mount and such a front connector with the first and second attachment elements extending through the first and second spacer openings.

In yet another exemplary aspect, a front connector can include a front connector pin opening and a spacer can include a spacer pin opening with the front connector and spacer pin openings being configured to align when such a spacer is positioned between the front vehicular mount and the front connector, so as to allow a pin to pass through the front connector and spacer pin openings.

In a further exemplary aspect, a first connector opening can be provided as an aperture or a slot.

In still a further exemplary aspect, a front connector flange can further include a ratchet opening.

In yet another exemplary embodiment, such an adapter can further include a rear connector having a base that can include at least one base opening and a rear connector flange having a rear connector attachment structure thereon.

In still yet another exemplary aspect, the at least one base opening can be configured to attach the rear connector to a rear vehicular mount positioned at another exterior portion of the vehicle closer to the rear portion than the front exterior portion, and the rear connector attachment structure can be configured to attach the vehicular accessory to the rear connector flange.

In a further exemplary aspect, at least a portion of the base rear can be planar and can extend along a first plane, and at least a portion of the rear connector flange can extend along a second plane.

In still a further exemplary aspect, such a rear connector flange can extend towards the front connector.

In still another exemplary aspect, a vehicular accessory can be a limb riser having a first end connected to the front connector flange and a second end connected to the rear connector flange.

DETAILED DESCRIPTION

It is an object of the present invention to provide a vehicular accessory adapter.

It is another object of the present invention to provide a vehicular accessory adapter that provides functional utility.

It is another object of the present invention to provide a vehicular accessory adapter that facilitates the attachment of accessories to a vehicle.

It should be noted that this disclosure includes a plurality of embodiments each having a plurality of elements, aspects, and/or steps and such elements, aspects, and/or steps need not necessarily be interpreted as being conjunctively required by one or more embodiments of the present invention. In particular, all combinations of such elements, aspects, and/or steps can enable a separate embodiment of the present invention, which may be claimed with particularity in any future filed Patent Application. Moreover, such elements, aspects, and/or steps disclosed herein, whether expressly or implicitly, are to be construed strictly as illustrative and enabling, and not necessarily limiting. Therefore, it is expressly set forth that any elements, aspects, and/or steps, independently or in any combination of one of more thereof, are merely illustratively representative of one or more embodiments of the present invention and are not to be construed as necessary in a strict sense.

Further, to the extent the same element, aspect, and/or step is defined differently anywhere within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

According to the present invention, components of the present invention can be formed from any one or more materials or combinations of materials, such as one or more of plastic, rubber, wood, metal, a crystalline material, or any other man-made or naturally occurring material, for example and not in limitation, insofar as the same if functionally consistent with the invention as described. Further, such components can be manufactured in any one or more functionally compatible manners, such as through molding, machining, stamping, etc.

Figure 1:
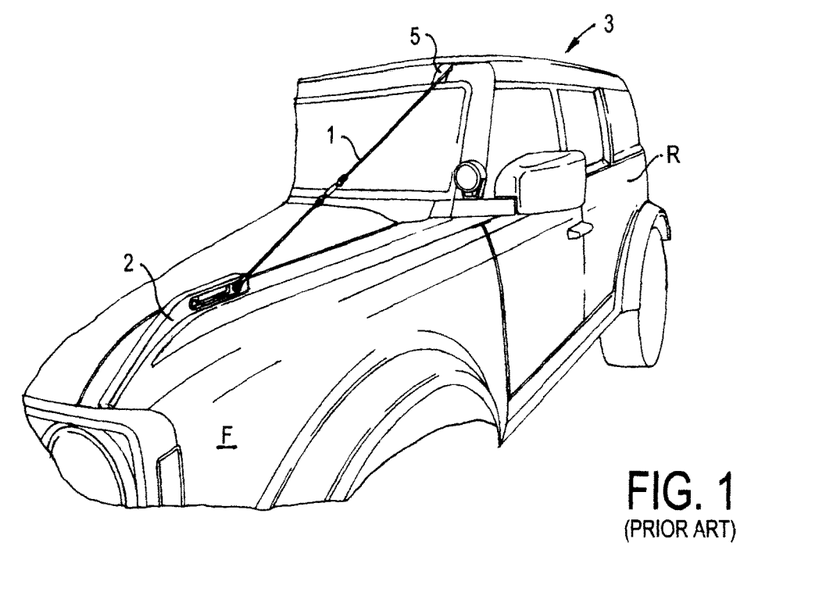
FIG. 1 illustrates a prior art arrangement of a vehicular accessory connected to prior art front and rear vehicular mounts.

FIG. 1 illustrates an exemplary environment of the present invention, which includes a prior art arrangement of a vehicular accessory 1 attached to a front vehicular mount 2 of a vehicle 3, where the front vehicular mount is positioned at a vehicle front 4, and a rear vehicular mount 5, where the rear vehicular mount is positioned closer to the vehicle rear.

Figure 2:
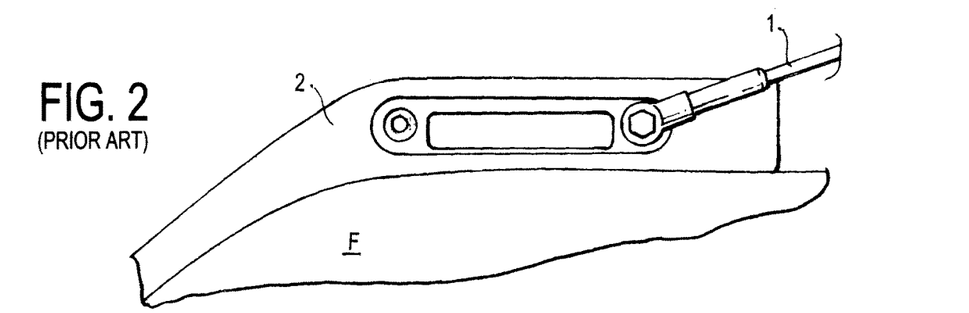
FIG. 2 illustrates a prior art vehicular accessory connected to a prior art front vehicular mount.

FIG. 2 illustrates a prior art vehicular accessory 1 connected to a prior art vehicular mount 2, which as illustrated, can include a vehicular mount available for the sixth-generation Ford® Bronco®.

FIGS. 3A-3B and 4A-4B illustrate an exemplary embodiment of the present invention, in which a vehicular accessory adapter can include a front connector 10 having a main body 11, first and second front connector openings 12, 13, and a front connector flange 14 extending from the main body and having a front connector attachment structure 15; and first and second attachment elements 16, 17.

In an exemplary aspect of the present invention, at least a portion of main body 11 can be provided with a planar shape. In another exemplary aspect of the present invention, first and second front connector openings 12, 13 can be configured to respectively allow first and second attachment elements 16, 17 to pass therethrough and fixably engage front connector 10 to front vehicular mount 2, such as via friction for example and not in limitation. Notably, first and second front attachment elements 16, 17 have been illustratively shown as bolts, but are not limited thereto. Accordingly, any alternative connection structure(s) (such as a catch, magnet, clamp, quick-connect, latch/patch pin, etc., for example and not in limitation) can be utilized insofar as functionally compatible with the present invention.

In another exemplary aspect, as illustrated, front connector attachment structure 15 can be provided as an aperture to allow attachment of a vehicular accessory 1 to front connector flange 14, as further discussed below.

Figure 4A:
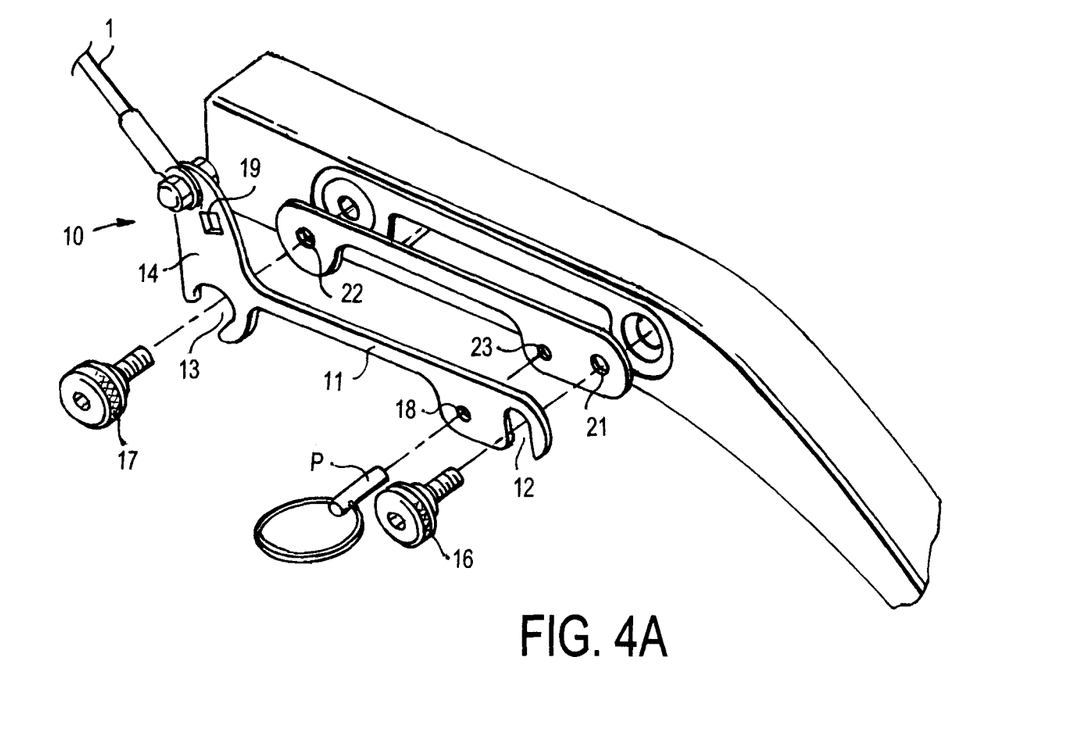
FIG. 4A illustrates an exploded view of an exemplary front connector with optional spacer.
Figure 4B:
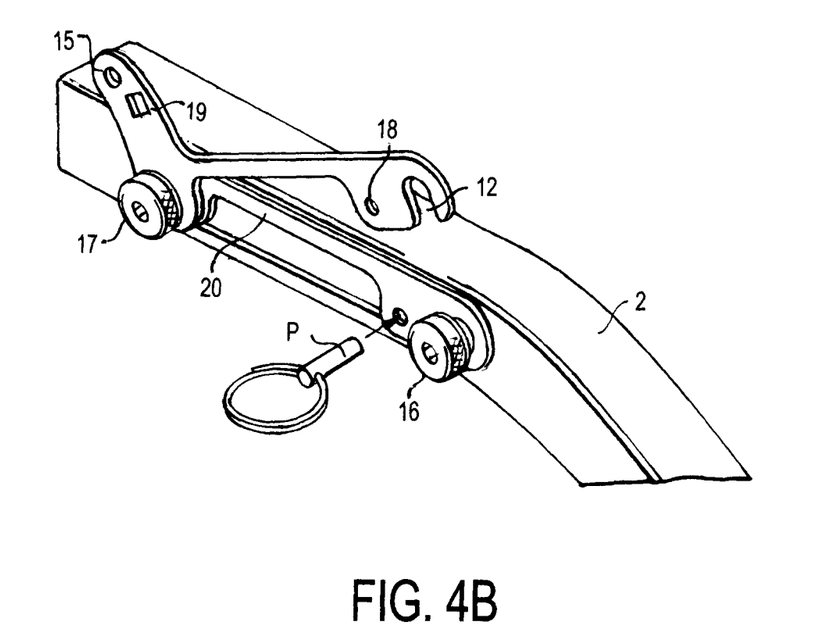
FIG. 4B illustrates an exemplary front connector attached to a front vehicular mount.

FIGS. 4A and 4B illustratively show an exemplary engagement of front connector 10 with an exemplary front vehicular mount 2.

As illustrated in FIG. 4A, vehicular accessory 1 can be provided as a limb riser, and can be connected to front connector 10 via attachment to front connector attachment structure 15. As illustratively shown, such attachment can be effectuated via a bolt-nut combination, for example and not in limitation, but is not limited therewith.

FIG. 4B illustrates an exemplary front connector 10 in a pivoted position, in which second attachment element 17 can be engaged with front vehicular mount 2 and second front connector opening (see FIG. 4A) can be engaged with the second attachment element. As such, front connector 10 can be pivotal about second attachment element 17, which can be highly desirable when installing or uninstalling front connector 10 and/or vehicular accessory 1. As illustrated in FIG. 4A, front connector flange 14 can optionally include a ratchet opening 19, which can allow engagement of a ratchet (not shown) with front connector flange 14, and allow a user to forcefully pivot front connector 10 so as to move first front connector opening 12 over first attachment element 16, which can then statically attach the front connector to front vehicle mount 2. Such action can increase the tension on vehicular accessory 1.

In still another exemplary embodiment of the present invention, a vehicular accessory adapter can optionally include a spacer 20 to offset front connector 10 when attached to a front vehicular mount 2 by being positioned between the front connector and the front vehicular mount. As illustrated in FIG. 4A, spacer 20 can be provided with first and second spacer openings 21, 22, which can be positioned to compatibly align with first and second front connector openings 12, 13 so as to allow first and second attachment elements to respectively pass therethrough when attaching front connector 10 to front vehicular mount 2.

Figure 3A:
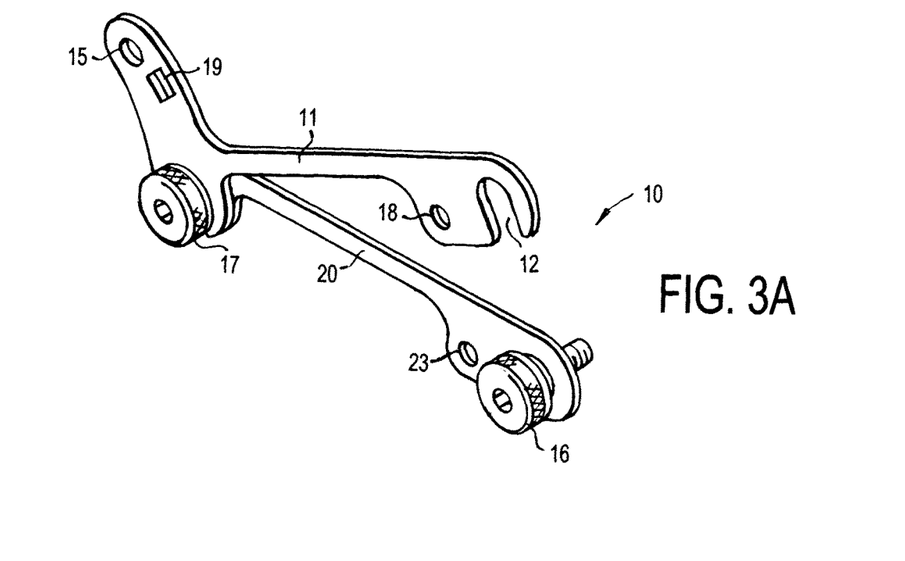
FIG. 3A illustrates an exemplary front connector having an optional spacer.
Figure 3B:
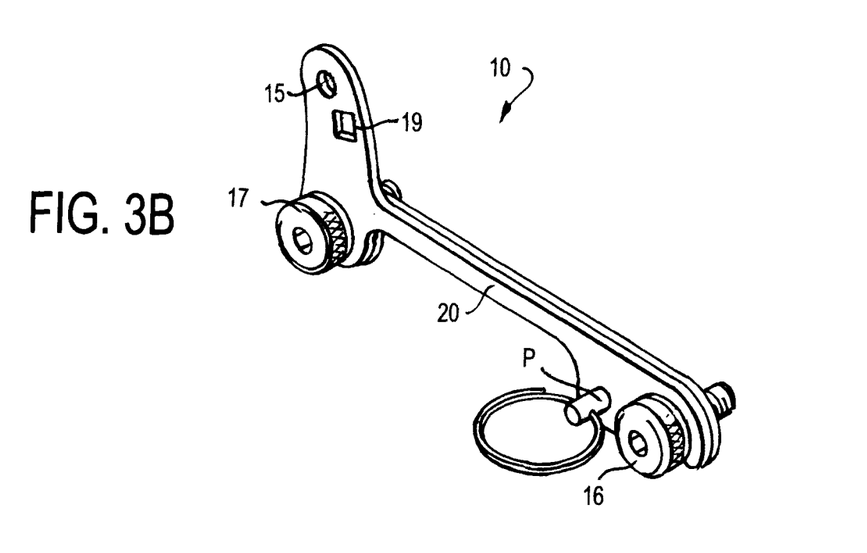
FIG. 3B illustrates an exemplary front connector having an optional spacer, with the front connector being positioned to allow an optional pin engaged through the front connector and spacer.

In still another exemplary aspect, optionally, front connector 10 can include a front connector pin opening 18 and spacer 20 can include a spacer pin opening, which can be positioned to compatibly align to allow a pin P to pass therethrough when the same are attached to front vehicular mount 2.

Figure 5:
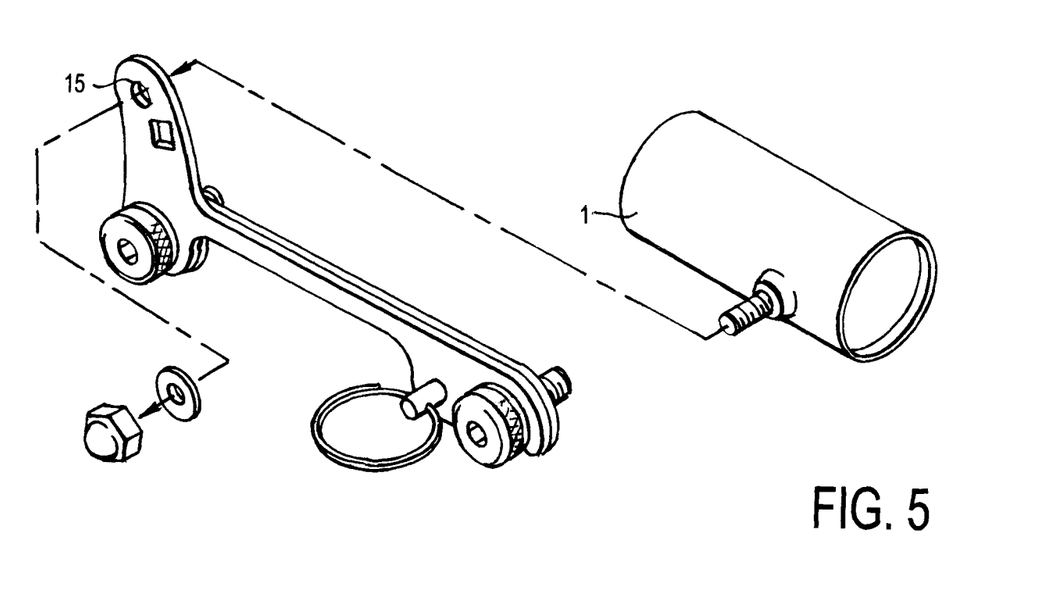
FIG. 5 illustrates an exemplary front connector having a vehicular accessory configured as a light.

As illustratively shown in FIG. 5, vehicular accessory 1 can be provided as a light. As illustratively shown, vehicular accessory 1 can include a bolt, washer, and nut for attachment of the accessory through front connector attachment structure 15, for example and not in limitation.

Figure 6A:
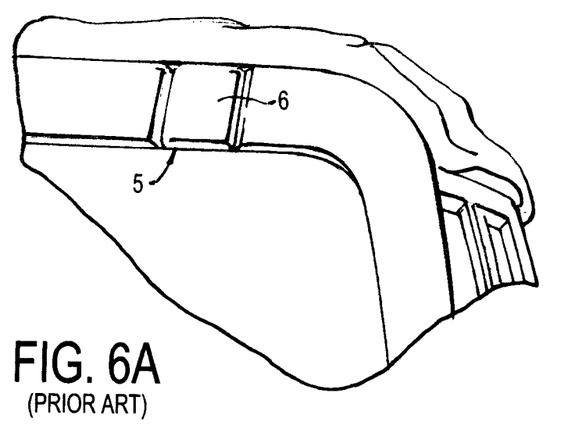
FIG. 6A illustrates a prior art rear vehicular mount having a cover.
Figure 6B:
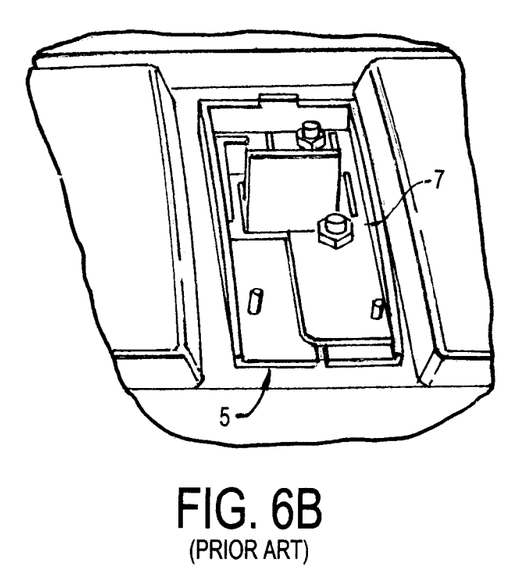
FIG. 6B illustrates a prior art rear vehicular mount without a cover.

FIGS. 6A and 6B illustrate another exemplary environment of the present invention that includes a rear vehicular mount 5, which can include a cover 6, and a lock plate 7 for securing the cover to the rear vehicular mount. For example, rear vehicular mount 5 can be on available for the sixth-generation Ford® Bronco®.

Figures 7, 8:
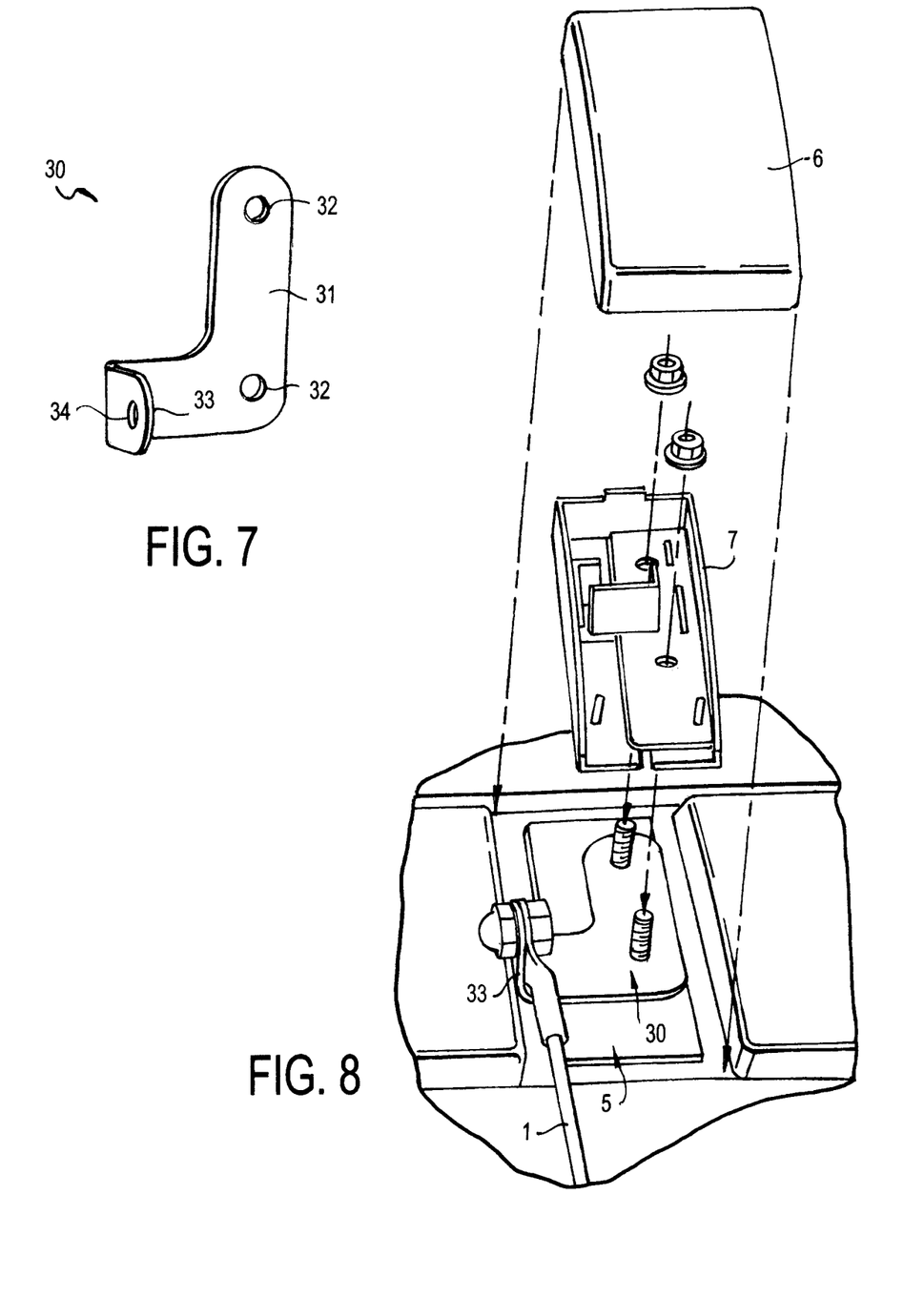
FIG. 7 illustrates an exemplary rear connector.
FIG. 8 illustrates an exploded view of an exemplary rear connector configured to be compatibly attached to a prior art rear vehicular mount.

FIGS. 7 and 8 illustrate another exemplary embodiment of the present invention, in which a vehicular accessory adapter can further include a rear connector 30 having a base 31 with at least one base opening 32 and with a rear connector flange 33 having a rear connector attachment structure 34.

As illustrated in FIG. 8, rear connector 30 can be configured to attachably interface with rear vehicular mount 5 and expose rear connector attachment structure 34 to allow connection of a vehicular accessory 1, such as a limb riser, for example and not in limitation, thereto. As illustratively shown in FIG. 8, rear connector 30 can be configured to allow lock plate 7 and cover 6 to reattach to rear vehicular mount 5 to the extent desired.

In an exemplary aspect, at least a portion of base 31 can be planar and can extend along a first plane, and at least a portion of rear connector flange 43 can extend along a second plane. In another exemplary aspect, rear connector flange 43 can extend away from base 31.

It should be particularly noted that illustratively shown and described shapes and connection structures and elements herein are not to be necessarily construed as limiting. Accordingly, a broad range of functionally compatible shapes and connection structures and elements are expressly intended to be equivalents insofar as functionally compatible with the present invention.

It will be apparent to one of ordinary skill in the art that the manner of making and using the claimed invention has been adequately disclosed in the above-written and attached description of the exemplary embodiments and aspects of the present invention.

It should be understood, however, that the invention is not necessarily limited to the specific embodiments, aspects, arrangement, and components shown and described above, but may be susceptible to numerous variations within the scope of the invention. For example, the present invention contemplates the utilization of various attachment structures and attachment elements, which are not intended as limiting, but rather illustrative and enabling. Indeed, the present invention contemplates a broad range of known and apparent structures and elements as applicable equivalents insofar as functionally consistent with the present invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents apparent to one of ordinary skill in the art.

Therefore, I claim:

1. A vehicular accessory adapter configured to attach a vehicular accessory to a front vehicular mount positioned at a front exterior portion of a vehicle having a hood positioned below the front vehicular mount, said adapter comprising:
   a front connector having a main body, a first front connector opening, a second front connector opening, and a front connector flange extending from the main body and having a front connector attachment structure thereon;
   a spacer having first and second spacer openings, wherein said spacer is configured to be positioned between the front vehicular mount and said front connector with said first and second attachment elements extending through the first and second spacer openings; and
   first and second attachment elements;
   wherein said first and second attachment elements are respectively configured to extend through the first and second front connector openings and to interface with the front vehicular mount so as to attach said front connector to the front vehicular mount, and the front connector attachment structure is configured to attach the vehicular accessory to the front connector flange.

2. The adapter of claim 1, wherein the front connector flange extends away from the second front connector opening.

3. The adapter of claim 1, wherein said front connector includes a front connector pin opening and said spacer includes a spacer pin opening, and the front connector and spacer pin openings are configured to align when said spacer is positioned between the front vehicular mount and said front connector, so as to allow a pin to pass through the front connector and spacer pin openings.

4. The adapter of claim 1, wherein the front connector flange includes a ratchet opening.

5. The adapter of claim 4, further comprising a spacer having first and second spacer openings, wherein said spacer is configured to be positioned between the front vehicular mount and said front connector with said first and second attachment elements extending through the first and second spacer openings.

6. The adapter of claim 5, wherein said front connector includes a front connector pin opening and said spacer includes a spacer pin opening, and the front connector and spacer pin openings are configured to align when said spacer is positioned between the front vehicular mount and said front connector, so as to allow a pin to pass through the front connector and spacer pin openings.

7. The adapter of claim 1, wherein the first and second front connector openings are laterally spaced apart.

8. A vehicular accessory adapter configured to attach a vehicular accessory to a front vehicular mount positioned at a front exterior portion of a vehicle having a hood positioned below the front vehicular mount, said adapter comprising:
   a front connector having a main body, a first front connector opening, a second front connector opening, and a front connector flange extending from the main body and having a front connector attachment structure thereon; and
   first and second attachment elements;
   wherein the first connector opening is a slot, said first and second attachment elements are respectively configured to extend through the first and second front connector openings and to interface with the front vehicular mount so as to attach said front connector to the front vehicular mount, and the front connector attachment structure is configured to attach the vehicular accessory to the front connector flange.

9. The adapter of claim 8, wherein the front connector flange includes a ratchet opening.

10. The adapter of claim 9, further comprising a spacer having first and second spacer openings, wherein said spacer is configured to be positioned between the front vehicular mount and said front connector with said first and second attachment elements extending through the first and second spacer openings.

11. The adapter of claim 10, wherein said front connector includes a front connector pin opening and said spacer includes a spacer pin opening, and the front connector and spacer pin openings are configured to align when said spacer is positioned between the front vehicular mount and said front connector, so as to allow a pin to pass through the front connector and spacer pin openings.

12. A vehicular accessory adapter configured to attach a vehicular accessory to a front vehicular mount positioned at a front exterior portion of a vehicle having a hood positioned below the front vehicular mount, said adapter comprising:
   a front connector having a main body, a first front connector opening, a second front connector opening, and a front connector flange extending from the main body and having a front connector attachment structure thereon;
   a rear connector having a base with at least one base opening and a rear connector flange having a rear connector attachment structure thereon; and
   first and second attachment elements;
   wherein said first and second attachment elements are respectively configured to extend through the first and second front connector openings and to interface with the front vehicular mount so as to attach said front connector to the front vehicular mount, the front connector attachment structure is configured to attach the vehicular accessory to the front connector flange, the at least one base opening is configured to attach said rear connector to a rear vehicular mount positioned at another exterior portion of the vehicle between the front exterior portion and a rear bumper of the vehicle, and the rear connector attachment structure is configured to attach the vehicular accessory to the rear connector flange.

13. The adapter of claim 12, wherein at least a portion of the base is planar and extends along a first plane, and at least a portion of the rear connector flange extends along a second plane.

14. The adapter of claim 12, wherein the rear connector flange extends away from the second the base.

15. The adapter of claim 12, wherein the vehicular accessory is a limb riser having a first end connected to the front connector flange and a second end connected to the rear connector flange.

\* \* \* \* \*

UNITED STATES PATENT AND TRADEMARK OFFICE
CERTIFICATE OF CORRECTION

| | |
|---|---|
| PATENT NO. | : 11,713,003 B2 |
| APPLICATION NO. | : 17/899764 |
| DATED | : August 1, 2023 |
| INVENTOR(S) | : William Frederick Hare |

It is certified that error appears in the above-identified patent and that said Letters Patent is hereby corrected as shown below:

In the Claims

Column 5, between Lines 35 and 36, insert -- first and second attachment elements; --.

Column 5, Line 46, delete "first and second attachment elements".

Signed and Sealed this
Sixteenth Day of April, 2024

Katherine Kelly Vidal
*Director of the United States Patent and Trademark Office*